United States Patent [19]
Jakeman et al.

[11] 3,842,252
[45] Oct. 15, 1974

[54] OPTICAL SIGNAL PROCESSING

[75] Inventors: Eric Jakeman, Birtsmorton, near Malvern; Robin Jones, Malvern; Christopher John Oliver, Malvern; Edward Roy Pike, Malvern, all of England

[73] Assignee: National Research Development Corporation, London, England

[22] Filed: May 26, 1972

[21] Appl. No.: 257,355

Related U.S. Application Data

[63] Continuation of Ser. No. 22,601, March 25, 1970, abandoned.

[30] Foreign Application Priority Data
Mar. 26, 1969 Great Britain.................... 15959/69

[52] U.S. Cl........... 235/181, 235/150.53, 324/77 H, 356/102
[51] Int. Cl....................... G06f 15/34, G06g 7/19
[58] Field of Search ..... 235/181, 150.53; 324/77 G, 324/77 H; 356/102

[56] References Cited
UNITED STATES PATENTS
| | | | |
|---|---|---|---|
| 3,036,775 | 5/1962 | McDermid et al............. | 235/150.53 |
| 3,463,911 | 8/1969 | Dupraz et al....................... | 235/181 |
| 3,495,077 | 2/1970 | Hiltz et al........................... | 235/181 |
| 3,555,258 | 1/1971 | Berthier et al..................... | 235/181 |
| 3,621,220 | 11/1971 | Ford.................................. | 235/181 |
| 3,792,245 | 2/1974 | Hocker et al...................... | 235/181 |

FOREIGN PATENTS OR APPLICATIONS
| | | | |
|---|---|---|---|
| 214,206 | 1968 | U.S.S.R............................ | 235/181 |

OTHER PUBLICATIONS
Princeton Applied Research Co., Signal Correlator Model 100, 4 pages, Note Block Diagr. p. 3, Nov. 1966.

*Primary Examiner*—Felix D. Gruber
*Attorney, Agent, or Firm*—Cushman, Darby & Cushman

[57] ABSTRACT

A digital correlator operates on digital input signals to provide a correlation function which equals the true autocorrelation of the input signal under certain conditions. The correlator divides a digital signal into two channels one of which provides an output whenever a predetermined number of input pulses is succeeded in each of a succession of equal time intervals and delays the signal, both channels are then multiplied together to form the required correlation function. The correlator may be used in conjunction with a laser and photodetector to detect motion of particles within a liquid illuminated by the laser. In this way the diffusion coefficient of the liquid may be determined.

5 Claims, 4 Drawing Figures

OPTICAL SIGNAL PROCESSING

This is a continuation, of application Ser. No. 22,601 filed Mar. 25, 1970, and now abandoned.

The present invention relates to a correlator for processing digital signals to provide a single clipped correlation function.

The determination of the molecular weight of large molecules such as protein molecules is a difficult and time comsuming process. The sedimentation weight can be determined in an ultracentrifuge and the molecular weight found from Svedberg's equation which says that the molecular weight is equal to the sedimentation weight divided by the diffusion coefficient, but the diffusion coefficient is also very difficult to measure. In general the most practical and accurate way of determining the molecular weight is by allowing the material in the ultracentrifuge to obtain equilibrium sedimentation, when the variation of concentration with depth into the gravitational field can be used to determine the diffusion coefficient and in this way the molecular weight can be measured. Such a method is not often used because it is extremely time consuming.

According to the present invention there is provided optical signal processing apparatus including means for detecting radiation having a frequency function consisting of a plurality of simultaneous different doppler shifts in frequency from the frequency of a beam of intense coherent radiation, and means for generating a function of time representative of the frequency function of detected radiation.

The functions of time may be the Fourier transforms of the frequency function of simultaneous different doppler shifts, and from these Fourier transforms values of diffusion coefficients may be obtained.

"Optical" as used in this specification is intended to cover the infra-red and ultra-violet regions.

An embodiment of the invention will be described by way of example with reference to the drawings accompanying this Specification, in which.

Figure 1:
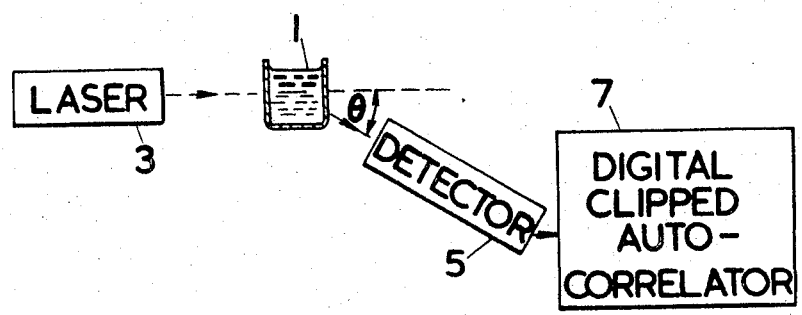
FIG. 1 is a block diagram of an optical signal processing arrangement.

FIG. 1 is a block schematic diagram of an optical signal processing arrangement. A transparent container 1 contains suspended material whose molecular weight is to be determined. The material in the container 1 is illuminated with intense radiation from a laser 3. Light scattered from the material in the container 1 is collected and detected in a detector 5 whose axis is at an angle $\theta$ off the axis of the laser 3 and whose output is applied to a digital clipped autocorrelator 7.

The action of the arrangement is as follows. The frequency of the light scattered by the material in the container 1 will be shifted from the incident frequency of the light from the laser 3 by doppler shifts which are characteristic of the Brownian motion of the molecules in the material in the container 1. It follows that the average doppler shift will be characteristic of the diffusion coefficient of the material in the container 1, and hence, by examining the spectrum of the scattered light, the diffusion coefficient of the material in the container 1 may be determined. The function of the digital clipped autocorrelator 7 is to extract sufficient information from the spectrum of the scattered light to determine the diffusion coefficient. This is done by the process of autocorrelation which will now be explained with reference to FIG. 2, which is a series of waveforms, plotted against time, illustrative of the theoretical basis of the invention.

Figure 2:
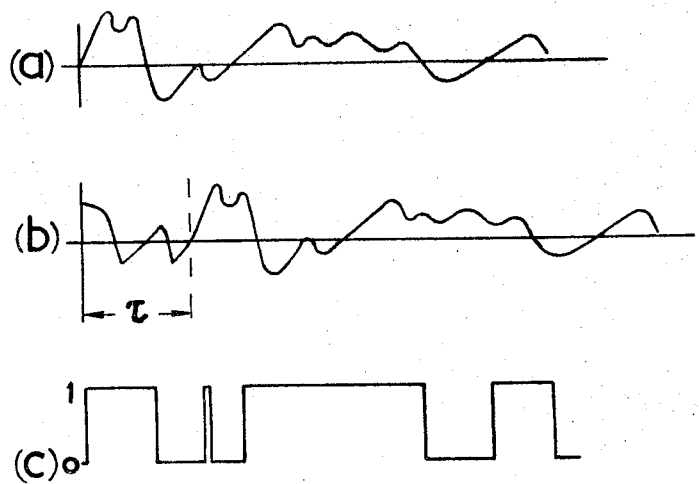
FIG. 2 is a series of waveforms, plotted against time.

Consider a waveform $E(t)$ with a complicated frequency spectrum, for example that shown in a waveform $(a)$ of FIG. 2. If such a waveform is displaced in time by an interval $\tau$ then the resultant is a waveform $E(t+\tau)$. The autocorrelation function $G(\tau)$ is defined as $$G(\tau) = \int_{-\infty}^{\infty} E(t)\, E(t+\tau)\, dt,$$

and its physical meaning is the area under the curve $F(t,\tau)$ which has a value at every time $t$ given by $F(t,\tau) = E(t)E(t+\tau)$. Obviously $G(\tau)$ will depend upon the value of the interval $\tau$.

It is impracticable to measure any waveform for an infinite time so for practical purposes $G(\tau)$ is defined as the average value $<F(t,\tau)>$ of $F(t,\tau)$:

$$G(\tau) = <E(t)E(t+\tau)>.$$

However, the computation of such a function still requires the calculation of $F(t_o, \tau_o)$ at a large number of values of $t_o, \tau_o$.

It has been shown that if $E(t)$ is replaced with the random telegraph function $E_k(t)$ where $E_k(t) = 1$ if $E(t) > k$ and $E_k(t) = 0$ if $E(t) \leq k$ for some value $k$, then $$G_k(\tau) = <E_k(t)\, E_k(t+\tau)> = 2/\pi \sin^{-1} G(\tau),$$

provided that $k$ is the mean value $\bar{E}$ of $E(t)$. A waveform $(c)$ of FIG. 2 shows the function $E_k(t)$ for $k = 0$. The replacement of $E(t)$ by $E_k(t)$ is referred to as clipping.

In practical terms, if the concentration of material in the container 1 in FIG. 1 is low then little light will be scattered by it and the detector 5, to be effective, will have to be very sensitive, in fact sensitive to the individual photons emitted in the direction of the detector 5.

This means that the waveform which is to have autocorrelation performed on it will have whole-number values only and may be written $n(t)$, which will have the meaning of the number of photons falling on the detector 5 in the interval between $(t - \frac{1}{2}T)$ and $(t + \frac{1}{2}T)$, where $T$ is a small time interval. Under the circumstances we can define a normalised autocorrelation function $g^{(2)}(\tau)$ given by $g^{(2)}(\tau) = <n(t)\, n(t+\tau)>/\bar{n}^2$, where $\bar{n} = <n>$.

The clipped version $n_k(t)$ can be defined as $n_k/t = 1$ if $n(t) > k$ $n_k(t) = 0$ if $n(t) \leq k$ and $n_k(t)$ can be measured with simpler equipment than $n(t)$.

Two clipped versions of the normalised autocorrelation functions are attractive. The first version $g_{oo}^{(2)}(\tau)$ is defined as $$g_{oo}^{(2)}(\tau) = <n_o(t)\ n_o(t+\tau)>/<n_o>^2,$$

both $n(t)$ and $n(t+\tau)$ being clipped at zero. It can be shown that $g_{oo}^{(2)}(\tau) \sim g^{(2)}(\tau)$ provided that $\bar{n}<<1$. The second version $g_k^{(2)}(\tau)$ is defined as $$g_k^{(2)}(\tau) = <n_k(t)\ n(t+\tau)>/<n_k>\bar{n}.$$

It can be shown that $$g_k^{(2)}(\tau) = 1 + 1+k/1+\bar{n}|g^{(1)}(\tau)|^2,$$

where $g^{(1)}(\tau)$ is the Fourier transform of the function $n(\omega)$:

$$g^{(1)}(\tau) = \int_{-\infty}^{\infty} n(\omega)\ \exp\ (-j2\pi\omega\tau)d\omega,$$

and $n(\omega)$ is the spectrum of the photon-counting fluctuations; the corresponding relation for $g^{(2)}(\tau)$ is $$g^{(2)}(\tau) = 1 + g^{(1)}(\tau)\ ^2.$$

Therefore if $k = \bar{n}$, that is, the signal is clipped at the mean count rate, then the clipped autocorrelation function will be equal to the true one. Alternatively, if one channel is clipped at $k = 0$ then the clipped autocorrelation function approaches the true one as $\bar{n}$ approaches 0.

Figure 3:
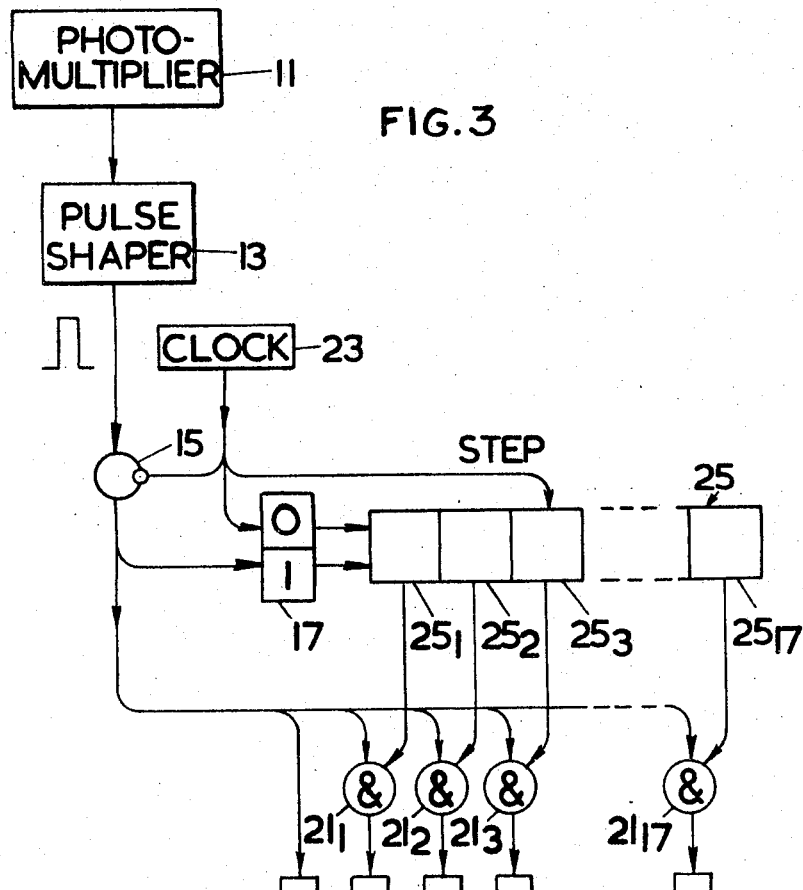
FIG. 3 is a block diagram of a digital clipped autocorrelator.

FIG. 3 is a block diagram of a detector and digital clipped autocorrelator in which the normalised autocorrelation function $g_k(\tau)$ (as defined above) is generated. A photomultiplier 11 feeds a pulse shaper 13. The photomultiplier 11 and the pulse shaper 13 together constitute the detector 5 of FIG. 1. The output of the pulse shaper 13 is applied, via an inhibiting gate 15, to an input of a bistable circuit 17 in such a way as to put it into the one-state and to 18 stores $19_0$, $19_1$, $19_2$, $19_3$, ..., $19_{17}$ in parallel. Seventeen coincidence gates $21_1$, $21_2$, $21_3$, ..., $21_{17}$ precede the stores $19_1$, $19_2$, $19_3$, ..., $19_{17}$ respectively.

A clock unit 23 generates a series of digital electric signals evenly spaced apart in time thereby establishing a plurality of successive time intervals. Thus, the clock 23 is arranged to emit a pulse at the end of each time interval T. The clock unit 23 feeds the inhibiting input of the inhibiting gate 15 and the bistable circuit 17 in such a way as to put it into the nought-state. The output bistable circuit 17 is applied to the first stage $25_1$ of a shift register 25 which is arranged to be stepped by the output of the clock 23. The shift register 25 has seventeen stages $25_1$, $25_2$, $25_3$, ..., $25_{17}$, and their outputs are applied in parallel to the coincidence gates $21_1$, $21_2$, $21_3$, ..., $21_{17}$ respectively.

The action of the circuit is as follows. Photons received by the photomultiplier 11 are thereby converted into pulses of electric energy which can be dealt with by the pulse shaper 13, whose function is to generate pulses having uniform height, duration, and rise and decay times, one pulse corresponding to one photon detected by the photomultiplier 11. The number of pulses produced by the pulse shaper 13 in consecutive time intervals of length T is made the subject of autocorrelation as follows. Firstly the time interval T is chosen such that it is much less than the characteristic time of the signal under study. The clock 23 is then arranged to emit a pulse at the end of each time interval T. Next, the clipping level $k$ is selected equal to $\bar{n}$ so that approximately equal numbers of zeros and ones are coupled to the circuit 17. In the specific embodiment disclosed in FIG. 3, $\bar{n}$ is small compared with 1 so that $k = 0$ has been selected. The clock 23 is arranged to emit a pulse at the end of each time interval T.

At the beginning of the investigation it is arranged (by means not shown in FIG. 3 but prefectly well-known to those skilled in the art) that the stores $19_0$, $19_1$, $19_2$, $19_3$, ..., $19_{17}$ are cleared and that all stages of the shift register 25 are set at zero. The first clock pulse from the clock pulse generator 23 will set the bistable circuit 17 in its nought-state. Any pulses received from the pulse shaper 13 during the first time interval T will be stored in the store $19_0$, and nowhere else since all the coincidence gates $21_1$, $21_2$, $21_3$, ..., $21_{17}$ are held shut because all the stages of the shift register 25 will be at zero. If any pulses are present in the first time interval T, then the bistable circuit 17 will be put into its one-state. At the conclusion of the first time interval T the clock pulse generator 23 will cause the shift register 25 to be stepped, inserting into the first stage $25_1$ whatever was the state of the bistable circuit 17 at the conclusion of the first time interval T. It also resets the bistable circuit 17 to its nought-state, and prevents pulses arriving from the pulse shaper 13 during the stepping of the shift register 25 by closing the inhibiting gate 15.

During the second time interval the number of pulses received from the pulse shaper 13 is added into the store $19_0$ and, if the first stage $25_1$ of the shift register 25 is in the one-state, the number of pulses received from the pulse shaper 13 during the second time interval T will be stored in the store $19_1$ via the coincidence gate $21_1$. The process continues for a total of eighteen time intervals T.

The contents of the stores $19_0$, $19_1$, $19_2$, $19_3$, ..., $19_{17}$ produced by this process can be seen from the following table, in which the columns denote the quantities stored in the individual stores at equivalent times corresponding to the individual rows. Therefore the sums of all the values in the individual columns gives the total amount stored in each individual store. In the table $n_r$ is the number of pulses detected in the time interval $T_r$ and $B_r$ is the Bolean function defined by function defined by $$B_x = 0\ \text{if}\ n_x = 0$$
$$B_x = 1\ \text{if}\ n_x \neq 0.$$

| Time interval | Stores | | | | | |
|---|---|---|---|---|---|---|
| | $19_0$ | $19_1$ | $19_2$ | $19_3$ | ... | $19_{17}$ |
| $T_1$ | $n_1$ | | | | | |
| $T_2$ | $n_2$ | $n_2B_1$ | | | | |
| $T_3$ | $n_3$ | $n_3B_2$ | $n_3B_1$ | | | |
| $T_4$ | $n_4$ | $n_4B_3$ | $n_4B_2$ | $n_4B_1$ | | |
| ... | | | | | | |
| $T_r$ | $n_r$ | $n_rB_{r-1}$ | $n_rB_{r-2}$ | $n_rB_{r-3}$ | | |
| $T_{17}$ | $n_{17}$ | $n_{17}B_{16}$ | $n_{17}B_{15}$ | $n_{17}B_{14}$ | ... | $n_{17}B_1$ |

Each store thus represents the difference $\tau$ between two time intervals, i.e. the contents of the store $\tau$ will be $\Sigma n_x B_{x-\tau}$, which is proportional to the autocorrelation function $g_o^{(2)}(\tau)$. Therefore the quantities stored in the stores $19_0, 19_1, 19_2, 19_3, \ldots, 19_{17}$ represent the autocorrelation function $g_o^{(2)}(\tau)$ plotted against time in increments of $T$, because $\bar{n}$ is very close to the clipping level zero. The number of times the seventeen step sequence is repeated determines the accuracy of the autocorrelation function.

Figure 4:
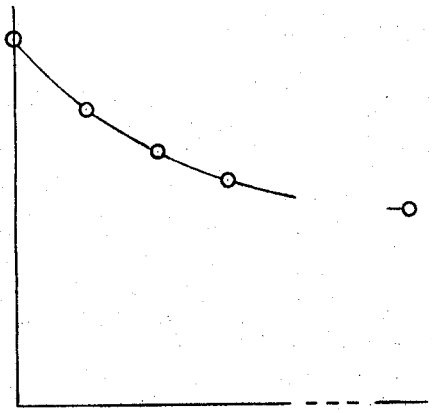
FIG. 4 is a graphical display of the output of the stores of FIG. 3.

The contents of the stores $19_0, 19_1, 19_2, 19_3, \ldots, 19_{17}$ may be used for plotting a graphical display such as is shown in the lower part of FIG. 4. The autocorrelation function produced will in general be an exponential decay which will in fact be the Fourier transform of the intensity fluctuation spectrum of the light scattered by the material in the container 1 in the FIG. 1. The decay time of the exponential function is related to the diffusion coefficient of the material in the container 1 of FIG. 1 in the following manner.

The observed autocorrelation function will have the form $$<n_o(t)\ n(t+\tau)>=<n_o\ \bar{n}\ [1+1+k/1+\bar{n}\ \exp(-2D_T|K^2|\tau)],$$

provided that the scattering process is a random process. This autocorrelation function is characterised by a decay time $1/D_T$, where $D_T$ is the diffusion coefficient. Therefore the diffusion coefficient can be obtained by fitting the data to the above equation. The mean value $\bar{n}$ of $n(t)$ is calculated from the total counts recorded in the store $19_0$. The value of $K$ is given by $$K = (4\pi N \sin \tfrac{1}{2}\theta)\lambda_o,$$

provided that the particle velocity of the material in the container 1, FIG. 1, is small compared with the velocity of light, where N is the refractive index of the solution in which the material is suspended, $\theta$ is the angle of scattering, i.e., the angle through which the laser beam is deflected, and $\lambda_o$ is the wavelength of the laser radiation in vacuo.

For low $\bar{n}$, $<n_o>$ approaches $\bar{n}$; a correction can be applied for higher values of $\bar{n}$, this correction depends on the statistics of the scattered light.

By combining the diffusion coefficient thus determined with the sedimentation rate, which can be determined in an ultracentrifuge in the order of one hour, the molecular weight of the material in the container 1 of FIG. 1 can be calculated using Svedberg's equation enunciated above.

We claim:

1. A digital correlator comprising an input to which digital electrical pulses may be supplied, clock means for establishing a plurality of successive time intervals, means responsive to said input pulses and to said time interval establishing means for providing an output whenever a predetermined number of input pulses is exceeded in each of said time intervals, delay means for delaying said output signal, said delay means and said means for providing an output being operatively controlled by the clock signals from said clock means for establishing a plurality of successive time intervals, gate means for multiplying the digital pulse signals received by the input of the correlator with the delayed signals from said delay means, and recording means for receiving digital signals from the multiplying gate means to generate data representative of the correlation of digital signals applied to the correlator.

2. A digital correlator for correlating incoming digital electrical signals comprising a clock for generating a series of digital electric signals evenly spaced apart in time, said digital electric signals establishing a plurality of successive time intervals, means responsive to said incoming digital electrical signals and to said clock signals for providing an output whenever a predetermined number of input pulses is exceeded in each of said time intervals, a shift register having an input connected to the output of said means for providing an output whenever a predetermined number of input pulses is exceeded, said shift register having a second input connected to said clock means, said shift register and said means for providing an output being operatively controlled by the clock signals from said clock, a plurality of gate means for multiplying the digital pulse signals received by the input of the correlator with the delayed signals from said shift register, each of said gate means having a first input connected to the output of a separate stage of said shift register and a second input to which incoming digital signals are applied, and recording means having a plurality of elements each separately connected to a separate output of one of said gate multiplying means to generate data representative of the correlation of digital signals applied to the correlator.

3. A digital correlator as claimed in claim 2 in which said means responsive to said input pulses and to said time interval establishing means for providing an output whenever a predetermined number of input pulses is exceeded includes a set/reset bistable circuit.

4. A digital correlator as claimed in claim 2 further comprising an inhibiting gate for preventing incoming digital signals from reaching said means for providing an output when a predetermined number of input pulses is exceeded and from reaching the gate means during the application of pulses from said clock means to said means for providing an output whenever a predetermined number of input pulses is exceeded.

5. A digital correlator as claimed in claim 2 wherein the recording means is a plurality of digital counters.

* * * * *